C. N. FAUBEL.
LOCK NUT.
APPLICATION FILED FEB. 29, 1912.

1,195,454.

Patented Aug. 22, 1916.

Witnesses
Anna T. Finotti
W. Wallace Nairn Jr.

Inventor
Charles N. Faubel
By Julius C. Dowell
His Attorney

UNITED STATES PATENT OFFICE.

CHARLES NICHOLAS FAUBEL, OF LITTLE ROCK, ARKANSAS.

LOCK-NUT.

1,195,454.  Specification of Letters Patent.  Patented Aug. 22, 1916.

Application filed February 29, 1912. Serial No. 680,628.

*To all whom it may concern:*

Be it known that I, CHARLES NICHOLAS FAUBEL, a citizen of the United States, residing at Little Rock, in the county of Pulaski and State of Arkansas, have invented certain new and useful Improvements in Lock-Nuts, of which the following is a specification.

This invention relates to improvements in lock-nuts, and more particularly to that class of devices in which an internally threaded nut of spiral form is screwed upon a bolt for locking the two parts together, in which position the nut is held by pressure-contact of the screw-threads resulting from axial expansion or contraction of the coils of the nut, together with a key or other means for securing the parts in a fixed position.

As heretofore constructed devices of the character referred to have been unsatisfactory and objectionable in use, because of their liability to mutilate or injure the threads of the bolt or nut, rendering it impossible to unscrew the nut, and also on account of the difficulty experienced in screwing up or unscrewing the nut against a gradually increasing resistance as the nut expands or contracts, with consequent mutilation of the threads, or the necessity for using some auxiliary device or special means for holding the coils compressed when screwed upon the bolt, and then allowing the nut to expand, or causing the coils of an expanded nut to contract and force the threads into tight embrace or binding contact with the threads of the bolt.

The object of my invention is to provide a simple and efficient device of the character referred to having a nut adapted to be forced upon a bolt of standard make and held in a fixed position, securing the two parts together, without danger of movement in case the material to be held together should become loose by use or shrinkage, and which may be screwed on or off the bolt without injuring the threads of either the bolt or the nut; the nut of itself and without other means providing a secure fastening, which will not permit it to move without the application of considerable force sufficient to turn it.

The invention will first be hereinafter more particularly described, with reference to the accompanying drawings, which are to be taken as a part of this specification, and then pointed out in the claims at the end of the description.

Figure 1:
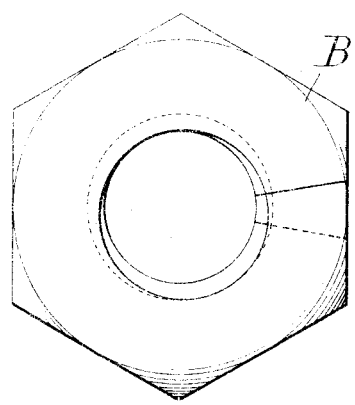
Figure 2:
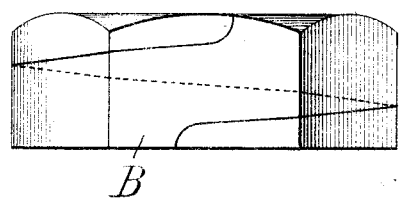
Figure 3:
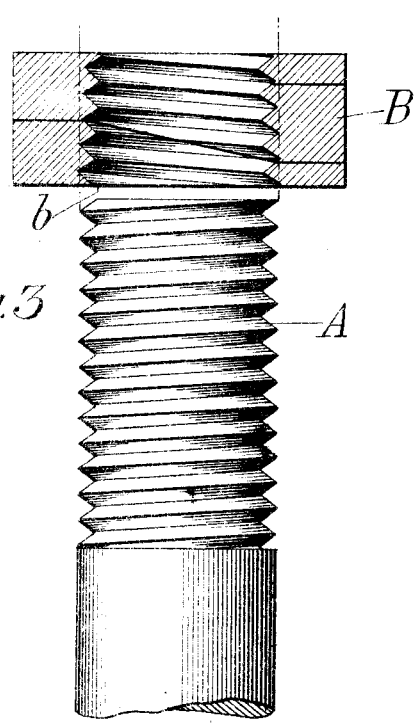
Figure 4:
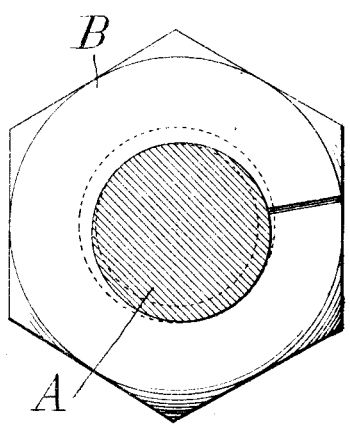

In said drawings Figure 1 represents an end view of a nut constructed in accordance with my invention; Fig. 2 is an edge view of the same; Fig. 3 is a plan view of the threaded bolt and a transverse section of the nut, illustrating said parts in position for assembling, and Fig. 4 is an end view showing the nut screwed upon the bolt.

Referring to said drawings, in which the same reference letters are used to designate corresponding parts in different views, the letter A denotes a bolt of ordinary construction or standard make, and B a nut having preferably two or more coils and interiorly tapered and threaded or tapped with a taper tap; the opening through the nut being larger at its inner end $b$ and tapering slightly toward its outer end, so that when forced upon the bolt its coils may yield or expand radially to such extent as may be necessary to permit it to be screwed upon the bolt and at the same time insure a firm grip that will lock the two parts together and render it impossible to turn the nut either forward or backward, except by the application of a wrench or other tool with sufficient force to overcome the resistance or binding force of contact between the screw threads exerted at an angle to the axis. To this end, the coils of the nut are compressed when threaded or tapped and will always remain compressed, as the threads of the nut are of the same pitch as those of the bolt, so that there is no tendency to separate the coils in screwing the nut upon the bolt or unscrewing the same.

As illustrated in Fig. 3 of the drawings, the threaded opening presented to receive the end of the bolt is of the same size as said bolt at that end of the nut, but is reduced in size toward the other end, so that as the nut is screwed up a firm grip or hold is secured by the time the farthermost end of the nut is reached, and continued turning from that point requires extraordinary force beyond the power of the human hand to exert, thus affording a very secure locking connection which will not work loose or get out of order. Such construction also has the advantage of preventing the screw-threads of either the bolt or nut from being mutilated, and overcomes the difficulties heretofore experienced in using devices of this character, due to the axial expansion of the nut and the difference in pitch between the threads of the screw and bolt, which not only renders it difficult to screw a helical nut upon a bolt a sufficient distance to effect the desired connection but destroys the screw-threads and also renders it exceedingly difficult, if not impossible, to unscrew the nut, at least after it has been in use for some time, and when such parts are removed they are of no further use, by reason of the mutilation of the screw-threads.

My improvement also overcomes the objections incident to the use of some special device, such as a clamp or other means for holding the coils of the nut in compressed position while it is being screwed upon the bolt, or means for effecting axial expansion or contraction of the nut either before or after it has been screwed upon the bolt, and allows sufficient freedom or play between the threads of the nut and bolt to enable the nut to be screwed on without mutilating the screw-threads.

It will be observed that the nut is divided or split radially so as to form a coil or coils having a main body portion of comparatively great width which gradually diminishes in width toward both ends of the coil which terminate abruptly abutting against shoulders on the thick intermediate portion of the nut, thus imparting the required strength and rigidity with sufficient resiliency to adapt the nut to bind with great force radially and yet prevent lateral expansion, while the threaded portion of the bolt is of uniform diameter throughout and of the same size as the entrance end of the opening through the nut, though larger than said opening at its other end, and that the screw threads of the nut are of the same pitch as those of the bolt, so that when the nut is screwed on it will tightly grip the bolt and will expand radially only without separating the coil or spreading the split portions of the nut apart and thereby injuring the screw threads. Thus a very firm hold is secured by the nut which cannot be removed without using a wrench or other suitable tool and consequently the screw threads of the bolt and nut will not be injured in screwing or unscrewing the nut.

Having thus described my invention, what I claim as new and desire to secure by Letters Patent of the United States is:—

A nut lock comprising a bolt having a threaded portion of uniform diameter throughout and a radially expansible nut of spiral form having a tapered bore with screw threads of the same pitch as those of the bolt, the threaded portion of the bolt being of the same diameter as the entrance end of said bore but larger than the other end thereof; said nut being split radially so as to form a coil having a comparatively thick intermediate portion and gradually diminishing in width to the terminals of the coil which end abruptly and abut shoulders or abutments on said intermediate portion, whereby strength and rigidity are combined with sufficient resiliency to permit the nut to expand radially while preventing lateral expansion thereof and adapt it to firmly grip the bolt and interlock therewith, substantially as described.

In testimony whereof I affix my signature, in presence of two witnesses.

CHARLES NICHOLAS FAUBEL.

Witnesses:
  Edw. B. Dounie,
  Jno. P. Streepey.